(12) United States Patent
Beans et al.

(10) Patent No.: US 8,538,414 B1
(45) Date of Patent: Sep. 17, 2013

(54) MOBILE INTERACTION WITH SOFTWARE TEST CASES

(75) Inventors: Erik Beans, Sunnyvale, CA (US); Daniel Khuong, San Jose, CA (US); Rong Ou, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 1413 days.

(21) Appl. No.: 11/779,031

(22) Filed: Jul. 17, 2007

(51) Int. Cl.
*H04W 24/00* (2009.01)

(52) U.S. Cl.
USPC ........ 455/423; 455/67.11; 455/418; 714/38.1

(58) Field of Classification Search
USPC ................... 455/423, 67.11, 418, 419, 420
See application file for complete search history.

(56) References Cited

U.S. PATENT DOCUMENTS

| | | | |
|---|---|---|---|
| 6,185,419 B1 | 2/2001 | Sasin et al. | |
| 6,243,089 B1 * | 6/2001 | Gong | 715/744 |
| 6,804,796 B2 | 10/2004 | Gustavsson et al. | |
| 7,143,310 B2 | 11/2006 | Gavish et al. | |
| 7,665,072 B2 | 2/2010 | Tillman et al. | |
| 7,865,780 B2 | 1/2011 | Dipper et al. | |
| 2003/0040936 A1 * | 2/2003 | Nader et al. | 705/1 |
| 2004/0153822 A1 * | 8/2004 | Arcand et al. | 714/38 |
| 2005/0272419 A1 * | 12/2005 | Matsuo et al. | 455/423 |
| 2006/0116865 A1 * | 6/2006 | Cheng et al. | 704/2 |
| 2006/0161508 A1 * | 7/2006 | Duffie et al. | 706/55 |
| 2006/0224681 A1 * | 10/2006 | Wurster | 709/206 |
| 2007/0005300 A1 | 1/2007 | Haggerty et al. | |
| 2007/0055911 A1 * | 3/2007 | Boehm et al. | 714/31 |
| 2007/0156591 A1 * | 7/2007 | Akutsu | 705/51 |
| 2007/0167155 A1 * | 7/2007 | Ishidu | 455/423 |
| 2007/0207798 A1 * | 9/2007 | Talozi et al. | 455/423 |
| 2008/0139195 A1 * | 6/2008 | Marsyla et al. | 455/423 |
| 2009/0197645 A1 | 8/2009 | Specchio et al. | |
| 2011/0161912 A1 | 6/2011 | Eteminan et al. | |
| 2011/0208338 A1 | 8/2011 | Eteminan et al. | |

\* cited by examiner

*Primary Examiner* — Vladimir Magloire
(74) *Attorney, Agent, or Firm* — Fish & Richardson P.C.

(57) ABSTRACT

A method of managing a software test case includes receiving a message about a test case from a test case management system, associating the message with a mobile device, and translating the message and transmitting the translated message to the mobile device.

21 Claims, 8 Drawing Sheets

MOBILE INTERACTION WITH SOFTWARE TEST CASES

TECHNICAL FIELD

This document discusses automated software engineering systems and methods, and more particularly, features relating to test case management.

BACKGROUND

Modern software applications and systems can be extremely complex, and may contain thousands or millions of lines of interrelated code spread across numerous files. Modern programs are also more interdependent than ever on other programs. That is because internet-based and other networked or otherwise connected systems continue to supplant stand-alone applications. Such networked applications may depend on many other programs to pass them appropriate data in order to run properly and without errors. Complex software systems carry with them a great risk of errors, such as so-called bugs.

Software generally is subjected to a number of iterative revisions as it moves from conception to initial launch (e.g., in alpha or beta test), and then through to commercial release. The process of identifying and tracking problems in software code as it goes through this process is generally referenced as quality assurance (QA), and entire departments may be devoted to such a function. One way that QA engineers attempt to identify problems in software for later eradication is by running a so-called "test case" by which software is run to see if its operates correctly and without errors.

A written test case can include a description of the functionality to be tested (taken, e.g., from the requirements for the software, or from "use cases," such as specific examples of how the software is intended to be used), and the expected output of the case, so that the functionality of the software can be verified as working correctly. The engineer may then run the software to check its operation against the expected operation. As a simple example, an engineer may test a piece of software for adding two numbers together by running the software using two exemplary numbers, and checking whether the output matches the output that is expected. As a more realistic example, an engineer may place information into a database that is to be accessed by a program, and then may query the database using the software program to see if the appropriate data is returned and presented.

Each version of compiled and tested software is often referenced as a "build" of the software. Test cases generally need to be run for every build. A collection of related test cases is often referenced as a test suite.

Generally, QA engineers can use a test case management system during testing to help them plan testing, run the tests or test cases, and report the results of the testing. For the plan, the system may create trackable and loggable test cases to test one or more functionalities of an application, and to associate test cases with a particular bug or feature. For the run, the system may determine a sequence of test cases that need to be run, and may pass through the test cases and log the results of the testing in a database. For the reporting, the system may find information about test cases that were run on a specific "build" of the software, and may track progress of software during the QA cycle. The reporting may also report on code coverage, along with load and performance statistics and test progress, among other things.

SUMMARY

This document describes systems and methods that may be employed to permit more flexibility in the tracking and management of test cases. A system serving as an interface may be provided to permit interaction with one or more test case management systems by using various forms of mobile devices and mobile communications. In one implementation, the system may serve as a central system located between the test case management system or systems and the mobile devices. On one side, the system may include a number of interface modules directed to each of a number of different test case management systems, so as to receive test case information from such systems, and to present control commands to the systems. On the other side, the system may include a number of interface modules directed to each of a number of mobile communication mechanisms or systems, such as e-mail, text messaging, and mobile web access. The system may also contain information for a profile for each of various users of the system, so as to communicate with each user in an appropriate manner. For example, some users may prefer to receive a telephone call when a test case is completed or has an error, or may prefer to instead (or in addition) receive an e-mail containing information about the test and/or a link to a web page containing more detailed information about the test, and an ability to interact with the test.

In one implementation, a method of managing a software test case is disclosed. The method comprises receiving a message about a test case from a test case management system, associating the message with a mobile device, and translating the message and transmitting the translated message to the mobile device. The message may be received through an application programming interface (API). The message may also be associated with the mobile device by applying a user associated with the test case in the test case management system to a database that correlates users to mobile device identifiers. The translated message may be transmitted as a text message, and as an e-mail message containing a hyperlink associated with the test case.

In some aspects, the method further comprises receiving from the mobile device a request from the hyperlink and transmitting mobile web-based data in response. Also, the web-based data may comprise data in format elected from the group consisting of WML, xHTML, iMode, and XML. In addition, the method may include receiving from the mobile device a request for information about the test case and requesting information from the test case management system in response to the request.

In another implementation, a computer-implemented system is disclosed. The system comprises a first interface configured to receive testing information from one or more test case managers, a message translator that translates the testing information into one or more mobile messaging formats, and a second interface configured to transmit translated testing information to one or more types of mobile devices. The system may further comprise a user database that correlates test case user identifiers with mobile device identifiers. The first interface may include an application programming interface (API), and the interface may comprise a plug-in module for the application programming interface. In addition, the second interface may include an application programming interface (API), and may include a text messaging module or an e-mail module. Moreover, the message translator may be further adapted to convert queries from the one or more types of mobile devices to commands for the one or more test case managers.

In yet another implementation, a computer-implemented system is disclosed that comprises a first interface configured to receive testing information from one or more test case managers, a second interface configured to transmit translated testing information to one or more types of mobile devices, and means for converting information between the first interface and the second interface.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
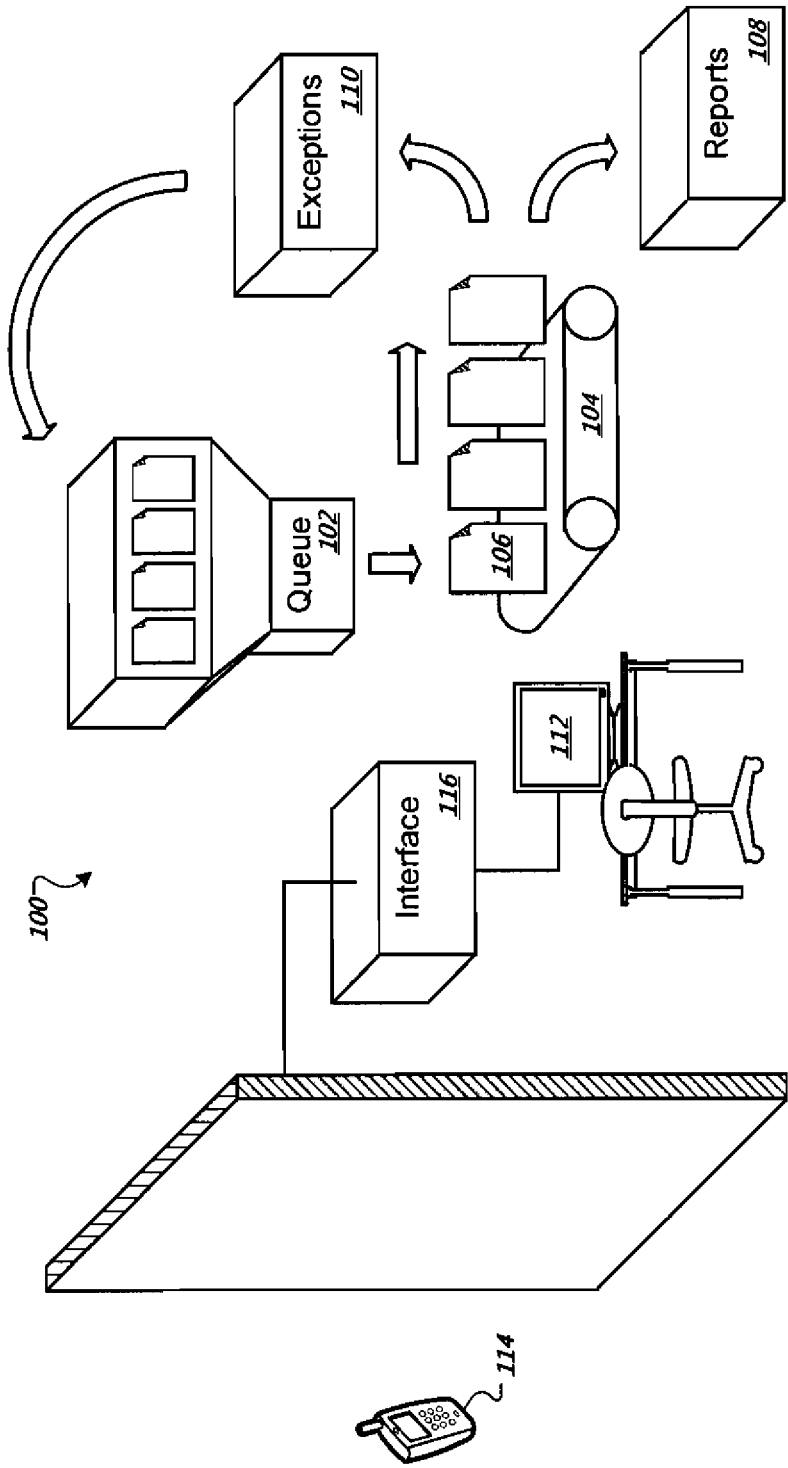
FIG. 1 is a conceptual diagram showing an example of a test case system.

In general, a test case management system includes a test case manager, a code database, one or more test cases, and one or more programming consoles. Programmers at the programming consoles produce source code that is stored and tracked in the source code database. The test case manager accesses the code, and determines which code should be tested to help ensure that the code is operable and bug-free. The test case manager retrieves data from the source code database and outputs testing information used to perform the test cases. The test case manager may be a commercial software application, such as Mercury TestDirector available from Mercury (www.mercury.com), ApTest Manager available from Applied Testing and Technology Incorporated (www.aptest.com), QaTraq available from Traq Software Limited (www.testmanagement.com), or TestLog available from PassMark Software Party Limited (www.passmark.com).

The source code database includes files that contain the programming, or source code, of a software application or applications. Programmers at programming consoles may create, delete, and/or update the files within the code database. The consoles may include, for example, personal desktop computers, laptop computers, or workstations running an appropriate operating system such as Microsoft Windows in its various forms, Apple's Mac OS, UNIX, Solaris, or Linux. The consoles may also operate an appropriate programming environment with programming tools, to assist the programmers in the process of creating, locating, and maintaining their code.

In some implementations, the code database may be managed by a revision control system (RCS), such as the commercially available RCS Perforce (www.perforce.com), though the particular type of RCS system is not critical. Such a system may be configured to track changes made to files in the code database. As a result, a programmer or a computerized system may be able to determine what changes have been made to the code from one version to another, and by whom the changes were made. In addition, the system may permit for reconstruction of the code at various points by tracking "deltas" between various versions of the code.

The testing information generated by the test case manager may indicate software test cases to be executed. For example, the report may include a list of files that were changed in order to ensure that the goal of a testing cycle is met, e.g., that the software is operated to a sufficient extent so as to conclude that a particular bug is not present or has been successfully removed from the code. The test case or test cases may also take certain input variables, which may be stored separately from the programming code, but in a location accessible to the operating application. For example, where the application is a search program, the data may include one or more exemplary search requests and a relatively large sample of responsive data. In such a situation, the test cases may involve the application of a variety of the search terms to one or more parts of the application.

Where multiple test cases are required, and particular data about the test cases is also to be referenced, the combination of information may be referenced as a test suite. The testing information may be in the form of such test suites, in that the test case manager may draw from various data sources, and not just the code database, change lists, and features, to generate the testing information.

The testing information may consist simply of information needed to operate a test case, such as identifiers for, or pointers to, files to be compiled and/or run, and data for inputting to the software (and perhaps data to which outputs should be compared, along with URLs). The testing information may also contain additional information, either as part of a single file or a group of related files. For example, the testing information may include an introduction that includes a unique identifier for the test case/suite, an identifier for the owner or creator of the test case/suite, a version of the test case/suite represented by the report, a description of the reason for the test case/suite (e.g., for later reference, similar to comments in source code), and a description of the requirement to be tested by the test case (e.g., operation of a certain portion of the software without errors).

In addition, the testing information or test cases in the testing information may contain a detailed written procedure for an engineer to conduct testing, or which describes what the automated test actually does during the test. The testing information may include preconditions or dependencies for a particular test case that are to be met before performing the test case. The preconditions may include, for example, another test case or some other action to be performed. The testing information may contain verification information describing an expected outcome of a test case.

FIG. 1 is a conceptual diagram showing an example of a test case system 100. In general, the system 100 is conceptualized as a form of factory for running test cases on computer code, in which the operation of the factory can be controlled from a control console 112. In addition, to provide more freedom to QA engineers and to permit shorter turn-around times for testing, the system 100 may additionally be provided with an interface 116 to the outside world, so that the system 100 may communicate information about test cases and receive commands for controlling test cases, from various mobile devices such as mobile device 114. As a result, a QA engineer may, in appropriate circumstances, be notified immediately about problems or other occurrences with his or her test case, and may immediately address the problem to get the test case back on track, and thereby shorten turn-around times. For example, the engineer may be eating lunch on another part of a corporate campus when a test case hangs up, and may be notified on his or her mobile telephone about the problem, and may then change certain variables to get the test case restarted.

In FIG. 1, a number of test cases in a queue 102 wait to be performed. Test cases move conceptually along a conveyor 104 as they are performed. For example, a test case 106 may be moved from the queue 102 to the conveyor 104 as it is performed, by a quality assurance (QA) engineer. Alternatively, the test case 106 may be performed automatically by the test case system 100. Information regarding the results of performing the test case 106 is placed in a reports repository 108. In certain implementations, only the results of successful test cases are placed in the reports repository 108. Test cases that generate an error or an exception are recorded or stored in an exceptions repository 110. One or more of the exceptions may be placed back in the queue 102 and performed again over the conveyor 104, such as after a QA engineer has revised the parameters for the test, or the code to be tested has been revised. For example, a change may be made to the test case or the item tested by the test case, which may yield a new result when performed again.

A control console 112 represents test case management software operating on an appropriately provisioned computer. As described above, test case management software may recommend test cases to be performed, control the performing of test cases, and track the results of performing the test cases. The control console 112 may send reports to or be controlled by a mobile device 114. The mobile device 114 may be, for example, a cell phone, a smartphone, a personal digital assistant, or a notebook computer. The control console 112 is shown as a single master control for illustration, but may be one of numerous workstations or mobile devices used by QA engineers in a department.

The mobile device 114 allows a QA engineer to monitor output from, or issue controls to, the control console 112 from a remote location, such as a restaurant, movie theatre, or the QA engineers home. For example, a particular test case may take more than one work day to complete. The QA engineer may receive notification regarding the outcome of the test case or a suite of test cases at home after the test cases have completed. Alternatively, a QA engineer may be away from a testing area where a test case is performed, such as in a department meeting. When the test case completes, the QA engineer may be notified and may take appropriate action, such as by issuing a control to the control console 112 to perform the test case again or to perform a subsequent test. In another example, a person other than the QA engineer is alternatively or additionally notified, such as a supervisor of the QA engineer or a project manager. The supervisor/project manager may, for example, have other duties in addition to monitoring the outcome of the test case. The supervisor/project manager may be notified of the outcome of the test case or send controls to the control console 112 while performing other duties in a location other than the testing area, such as the supervisor/project manager's office. The supervisor/project manager may be provided with information about a test case only if the QA engineer associated with the test case does not respond in a predetermined time period after being notified, or only if a particularly important test case provides an exception, or a number of test cases fail and more systemic problems with the test case system are indicated. Also, QA engineers or others may be provided with various statistical reports about the test case system at mobile devices.

An interface 116 provides communication between the control console 112 and the mobile device 114. Particularly, the interface 116 may translate information sent from the control console 112 to the mobile device 114 into a format accepted by the mobile device 114. For example, the interface 116 may translate the report 108 into a Short Message Service (SMS) text message for presentation using a mobile device such as a text-enabled cell phone. Such translation may involving comparing the report to a template to parse out the most relevant information in the report and to forward such information to the mobile device 114, such as information about the start and stop times of the test, a summary of the test results, and an indication of whether the test performed successfully or not. Alternatively, the interface 116 may translate the report 108 into a format such as HyperText Markup Language (HTML), compact HTML (c-HTML), Extensible HyperText Markup Language (XHTML), or Wireless Markup Language (WML) for presentation using a mobile device, such as a smartphone or personal digital assistant (PDA). In addition, the interface 116 may translate controls received from the mobile device 114, such as a control in an HTML form format, into a format accepted by the control console 112, such as a call to an application program interface (API).

The form of application on the mobile device 114 may take a number of forms. For example, it may simply be native applications on the device 114, such as text-messaging or a basic web browser, and may be communicated with by conventional techniques for such applications, such as by the provision of simple web pages. Also, a web browser may be communicated with in a more active manner, such as by using AJAX or similar techniques, and one or more browser plug-ins may be provided to further extend the functionality of the browser with respect to a test case system. The device 114 may also be provided with one or more stand-alone web applications running independent of any particular other application of native applications on the device 114.

Figure 2:
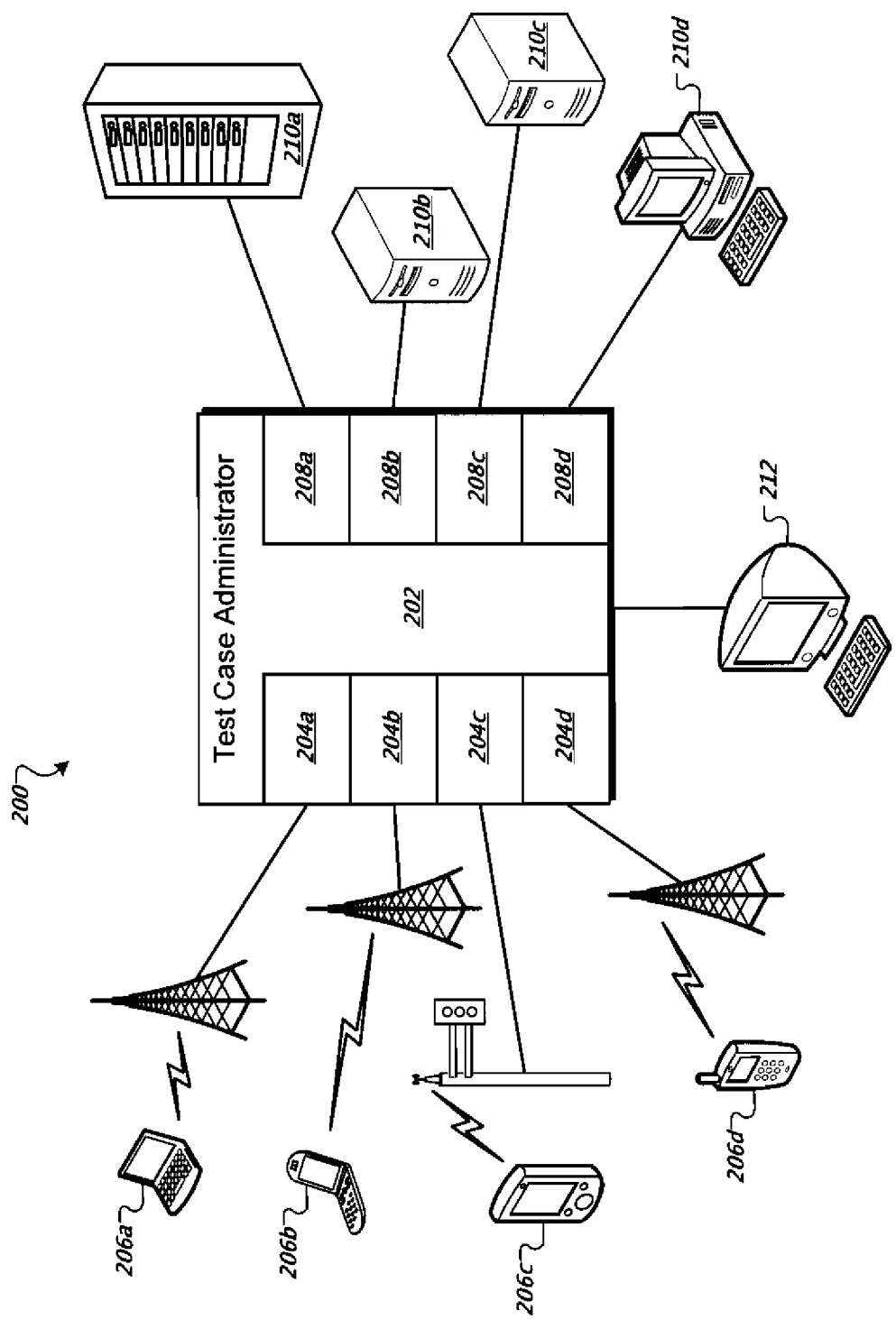
FIG. 2 is a schematic diagram showing an example of a test case system that provides for remote monitoring and control.

FIG. 2 is a schematic diagram showing an example of a test case system 200 that provides for remote monitoring and control. The system 200 includes a test case administrator 202 containing plug-ins modules 204a-d that provide communication to mobile devices 206a-d, respectively. In addition, the test case administrator 202 contains plug-ins modules 208a-d that provide communication to test case management systems 210a-d, respectively.

For example, using the plug-in module 208a, the test case administrator 202 receives a message from the test case management system 210a. The test case management system 210a may be, for example, a commercially available test case management system having various capabilities. Using the plug-in module 204a, the test case administrator 202 converts messages from test case management system 210a into a format supported by the mobile device 206a. The test case administrator 202 transmits the converted message to the mobile device 206a.

In another example, the test case administrator 202 may receive a message from the mobile device 206b using the plug-in module 204b. Using the plug-in module 208b, the test case administrator 202 converts the message into a format supported by the test case management system 210b. The test case administrator 202 then transmits the converted message to the test case management system 210b.

In general, to simplify the task of managing communications between test case management systems 210a-210d and mobile devices 206a-206c, test case administrator 202 may make all conversions to or from a common, generic format. Thus, for example, if additional modules are to be added to the system 200, they can be written to perform a single transformation to or from a particular test case management system or mobile device communication format, and need not be written to convert communications to all the possible types of devices or systems that may appear on the other side of system 200.

A new type of mobile device or test case management system may thus be added to the test case system 200 by creating a plug-in module for the mobile device or test case management system. In certain implementations, plug-in modules communicate with the test case administrator 202 using an API. For example, a mobile device provider or test case management system provider may provide a plug-in to be installed in the test case administrator 202 that uses the API to enable communication with the mobile device or test case management system. The API may be published by the maker of the test case administrator 202, which explains the various parameters by which third parties may develop plug in modules so that they properly interact with the test case administrator 202. In appropriate implementations, plug-ins may be provided on both the mobile device side of the system 200 and on the test-case management side of the system 200 to provide maximum flexibility.

The mobile devices 206a-d may communicate with the test case administrator 202 using wireless networks, such as a local area wireless network (e.g., WiFi), a wide area broadband wireless network (e.g., WiMAX), a cellular network (e.g., GSM, GPRS, CDMA2000, iDEN, Mobitex, EV-DO, or UMTS), a satellite network, a microwave network, or a proprietary network. In certain implementations, the wireless network may include or be in communication with the Internet.

The test case administrator 202 may include or be in communication with a control terminal 212. The control terminal 212 is a computer device, such as a desktop computer, and may also be connected to and/or include a server on which test case administrator 202 runs. The control terminal 212 allows a user to manage the test case administrator 202 with respect to the user's test cases. For example, the user may input notification information, such as an SMS handle or an e-mail address of the user. Alternatively, notification information may be retrieved from a database, such as a login system that stores user information. The control terminal 212 may be the same computer or computers that are also used to operate particular test case management systems 210a-210d, such as when a QA engineer first uses his or her computer to establish parameters for being notified remotely by test case system 200, and then uses his or her computer to set up and operate test cases in one of test case management systems 210a-210d.

A user may be associated with a particular test case, indicating, for example, whether the user will receive notifications regarding the status of the test case. The test case administrator 202 receives the status of one or more test cases from one or more of the test case management systems 210a-d. The status may indicate, for example, whether the test case completed, started, or stalled. The test case administrator 202 outputs the test case status in an SMS text message to one or more mobile devices associated with the test case. The SMS message may also include reports containing an analysis of test case results or a log of errors generated by one or more test cases. In addition, user permissions may be associated with a test case, for example, to allow the remote user to view the status of the test case or to send commands regarding the test case.

The test case administrator 202 may receive commands from one or more of the mobile devices 206a-d. For example, the test case administrator 202 may accept SMS text message commands from the mobile devices 206a-d that control the operation of one or more of the test case management systems 210a-d. The SMS commands may be selected from a lexicon of commands, such as "start," "stop," "repeat," "status," and "report," where each command is followed by an identifier of a test case and/or a test case management system. "Start" may indicate that a particular test case be initiated. "Stop" may indicate that a particular test case be stopped. "Repeat" may indicate that a particular test case be repeated a particular number of times. "Status" and "report" may request that the status or an analysis, respectively, of a particular test case be sent to the requesting mobile device.

The test case administrator 202 may parse incoming commands such as by breaking a command, e.g., "status," from a test case identifier, e.g., "Bobs_new_case" or "case1234." The parsed-out information may then be applied to particular fields associated with inputs to a test case management system running the particular test case. Such a transformation may occur via a generic data structure that includes a number of "least common denominator" fields for test case management. For example, certain values, such as test case names or identifiers, may be common across all or almost all test cases, and may thus be given a defined field in the generic data structure. Each of modules 204a-204d and 208a-208d may then be programmed to correspond the relevant field in its respective format with the common field in the generic data structure. In addition, the generic data structure may also include fields where less than all components use the field.

Moreover, the generic data structure may include one or more wild card fields that can carry various forms of data depending on the systems with which interaction takes place, and the modules 204a-d and 208a-d may be authored to transfer information to a particular one of the fields. Thus, for example, a user may understand that, for one test case management system, a third parameter in a message (after the command and the test case identifier) may have one effect, while for another test case management system, the third parameter may have a different effect.

In certain implementations, and particularly where one or more of the mobile devices 206a-d include a web browser application, the test case administrator 202 may provide a graphical user interface (GUI) to the mobile devices 206a-d. The GUI may provide a menu of commands associated with the test cases as well as lists of information associated with the test cases, such as the status of the test cases and estimated times for the initiation of the test cases. Also, a stand alone application on devices 206a-6 may also provided similar or extended GUI functionality.

In certain implementations, one or more of the mobile devices 206a-d may include a test case client application that accesses the test case administrator 202. The test case client application may provide a GUI to a user to view information received from the test case administrator 202 or to send commands to the test case administrator 202 regarding the test cases. The test case client application may store test case information in the mobile device, allowing the user to retrieve and/or review the information at a later time. Moreover, the mobile device may include programming code such as JavaScript code that makes requests of the test case system 200, such as using AJAX-related techniques, to manage the device and avoid the need for full page deliveries from test case system 200.

In addition, the mobile device may be docked (e.g., via physical dock, Bluetooth, or Irma) with a computer device, such as a desktop computer, in order to synchronize test case information in the computer with test case information in the mobile device. For example, the test case client application or another application in the mobile device may synchronize estimated test case completion times from the test case administrator 202 with a clock within the mobile device. The mobile device may use the estimated completion times to determine when to retrieve the status of test cases from the test case administrator 202 (using a "pull" approach). Alternatively or in addition, the mobile device may periodically retrieve test case status information from the test case administrator 202. The synchronized information may also include lists of commands for particular test cases so that a user need not later enter various parameters for the commands, but may instead invoke a script or other mechanism for making command entry easier.

Figure 3:
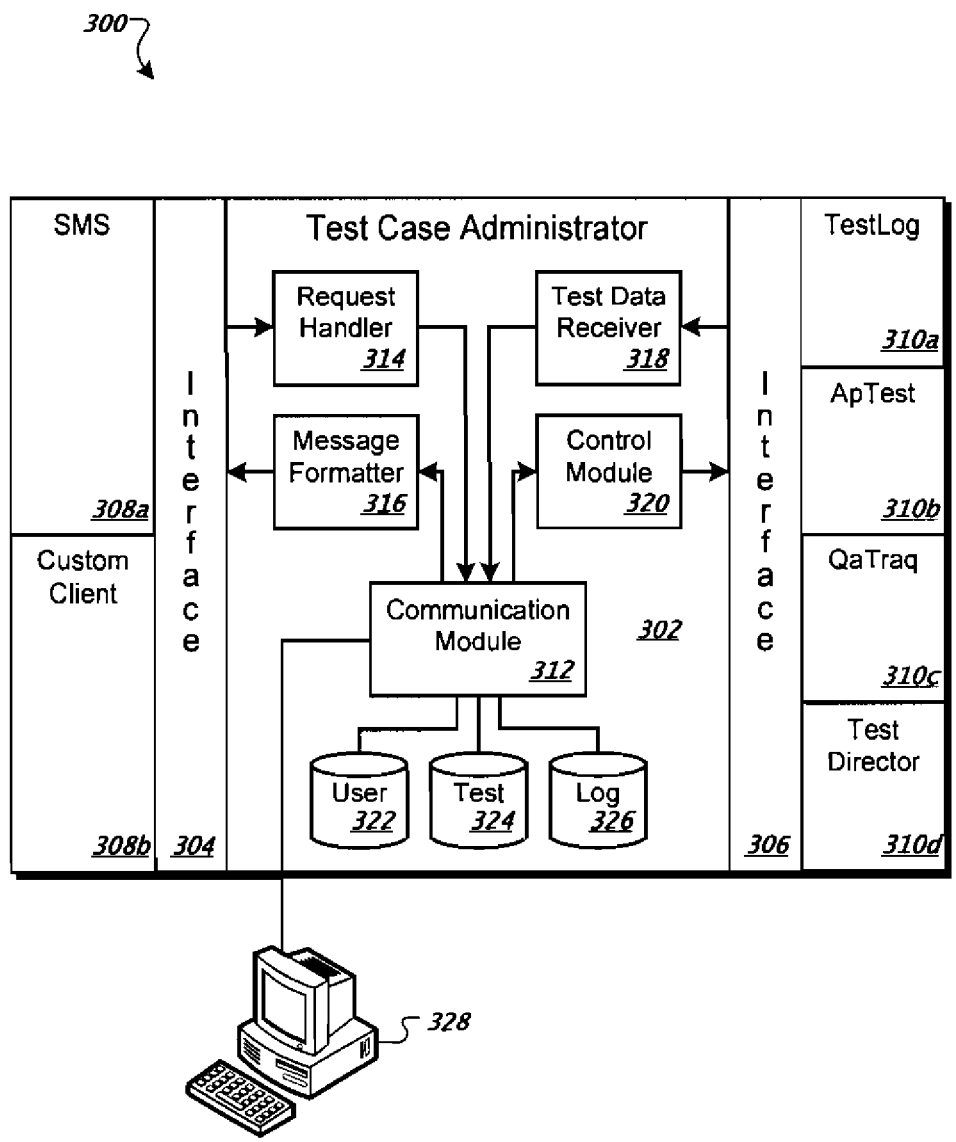
FIG. 3 is a schematic diagram showing an example of a test case administrator system for remote monitoring and control of test case execution.

FIG. 3 is a schematic diagram showing an example of a test case system 300 for remote monitoring and control of test case execution. The test case system 300 includes a test case administrator 302 that provides communication between one or more test case management systems and one or more mobile devices. The test case administrator 202 includes interfaces 304, 306 that provide communication to mobile device plug-in modules 308a-b and test case management system plug-in modules 310a-d, respectively. The mobile plug-in modules 308a-b provide access to SMS-enabled devices and custom mobile clients, respectively (though other modules could also, or alternatively, be selected). For example, mobile client plug-in modules may provide access to mobile clients using media, such as e-mail, HTML, xHTML, c-HTML, and WML. The test case management system plug-in modules 310a-d provide access to TestLog, ApTest, QaTraq, and TestDirector test case management systems, respectively, and may interoperate with APIs relating to those systems in addition to APIs associated with the test case administrator 302.

A communication module 312 processes messages that pass through the interfaces 304, 306. A request handler 314 receives commands from mobile devices through interface 304 and passes the requests to the communication module 312. The communication module 312 processes the requests and sends responses to the mobile devices using a response formatter 316. For example, the responses may include information about the status of a test case in response to a "status" command, about the success or failure of a test, or about the confirmation of a change made to a test case.

The response formatter 316 formats the response (e.g, in an SMS, HTML, xHTML, c-HTML, or WML format) and sends the response to the mobile device through interface 304. A test data receiver 318 receives test data (e.g., test case status or test case analysis) from test case management systems through interface 306. The communication module forwards the test data to a requesting mobile device and/or mobile devices associated with the test case. The communication module 312 also forwards commands from mobile devices to a control module 320. The control module 320 forwards the command to the associated test case management system through interface 306. The request handler 314, message formatter 316, test data receiver 318, and control module 320 may also be incorporated, for example, in the communication module 312, or the interfaces 304, 306.

The test case administrator 302 also includes a user database 322, a test database 324, and a log database 326. The user database 322 stores information regarding users of the test case system 300, such as user identifiers and mobile device contact information associated with each user. In certain implementations, a user may have more than one associated mobile device and the user database 322 may include an ordered list of mobile devices used to contact the user. For example, a user may elect to receive an e-mail first and then an SMS message after a predetermined period of time, to reduce charges incurred by the SMS messages. In such an example, the user may often be at their PDA having e-mail capability, but may at times be only around a less-capable cellular telephone that has only text-messaging capabilities. As such, the user may be allowed to "cascade" their communication styles to meet their particular needs.

The test database 324 stores test case information. For example, the test database 324 may store user identifiers associated with each test case. Also, the test database 324 may store information particular to the command structure for a certain test case management system, so as to provide for accurate translation of communications between various mobile devices and a particular test case management system. In certain implementations, test case information may be retrieved from a test case management system.

The log database 326 stores a record of messages sent and received by the test case administrator 302. For example, the log database 326 may include the message content and the time that the message was received or sent. In certain implementations, the log database 326 includes information linking one message to another message, a user, a mobile device, a test case management system, and/or a test case. For example, the log database 326 may include information that links a test case status message to a status request message, a mobile device that sent the status request, a test case management system that sent the status response, the test case associated with the status, and the user making the request. Each entry in a log may include one or more fields corresponding to each relevant aspect of a possible log entry, such as those just mentioned. A control terminal 328 allows test case administrator users to review recorded messages in the log database 326, and to input user information into the user database 322 and test case information into the test database 324.

Figure 4A:
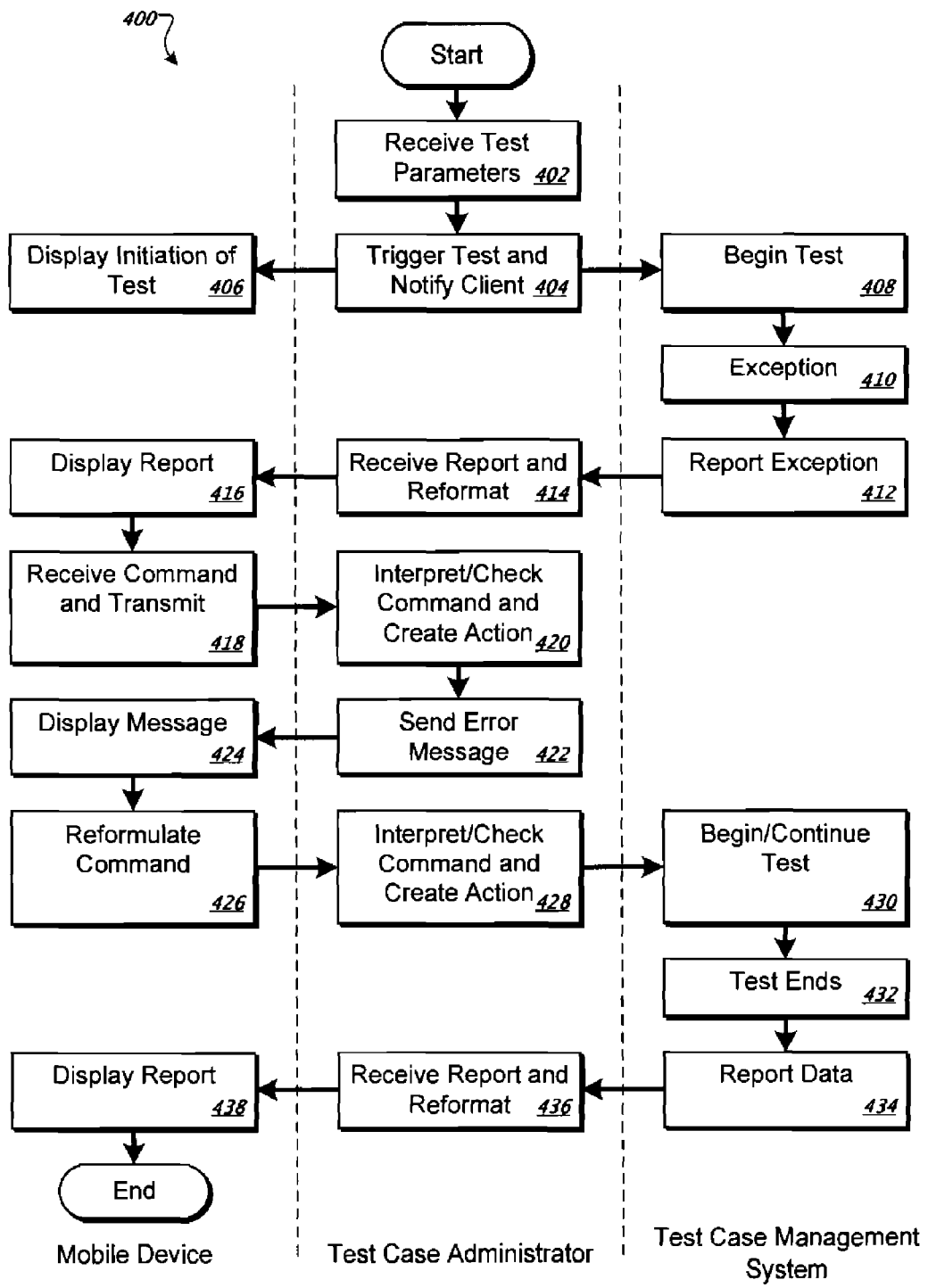
FIG. 4A is a swim lane diagram showing an example of a process performed by a test case system.
Figure 4B:
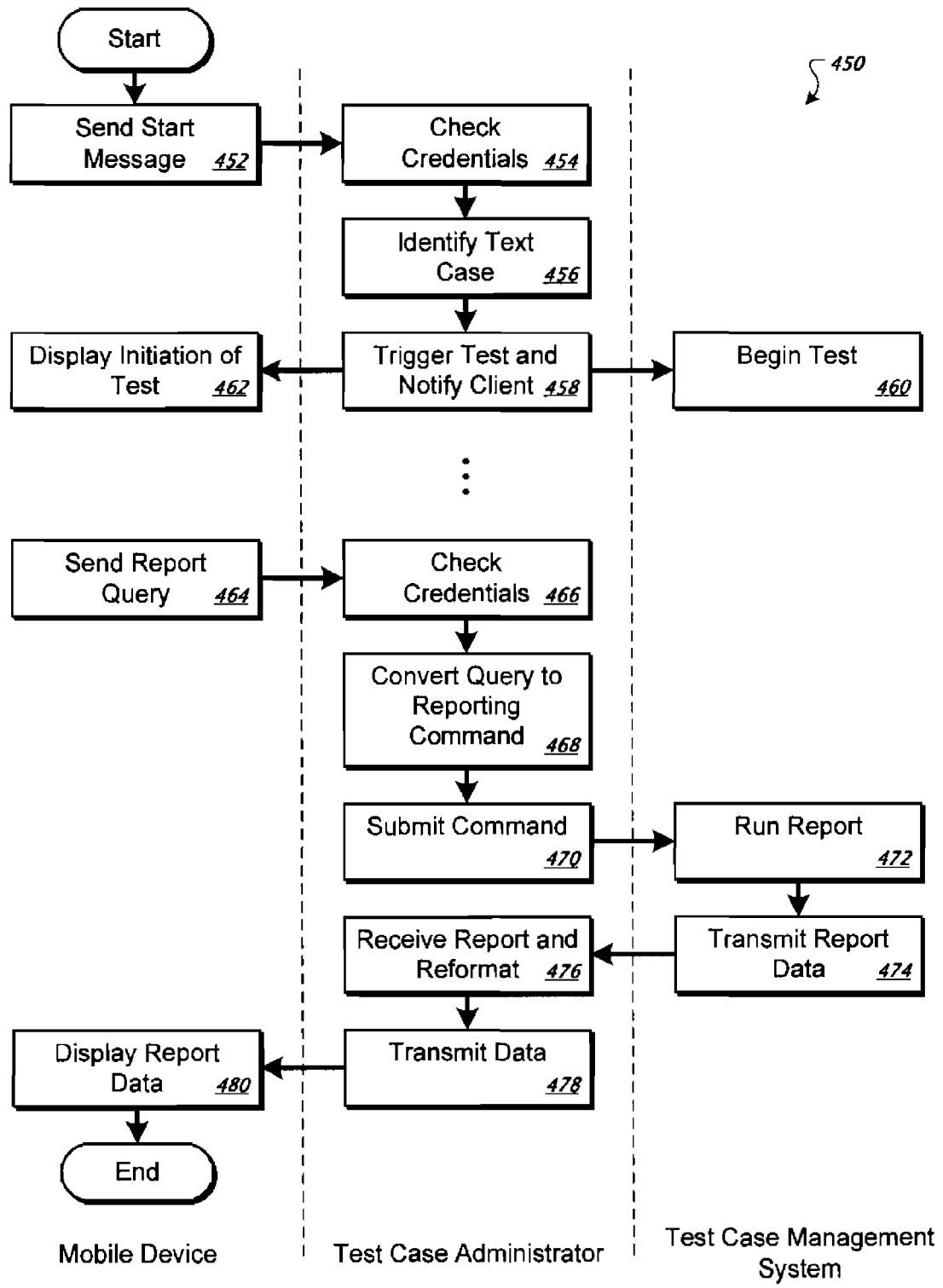
FIG. 4B is a swim lane diagram showing an example of a process performed by a test case system.

FIGS. 4A and 4B are swim lane diagrams showing examples of processes 400 and 450, respectively, that may be performed by a mobile device, a test case administrator, and a test case management system in a test case system. The processes 400 and 450 may be performed, for example, by a system such as the systems 100, 200, or 300. For clarity of presentation, the description that follows uses the systems 100, 200, and 300 as the basis of examples for describing the process 400 and 450. However, another system, or combination of systems, may be used to perform the processes 400 and 450. In addition, the processes 400 and 450 are exemplary only. Other processes, including processes that add to, subtract from, combine, or break apart, the actions shown in processes 400 and 450, may also be employed.

Referring to FIG. 4A, the process 400 may be performed by a mobile device, a test case administrator, and a test case management system in a test case system when executing a scheduled test case. The process 400 begins with receiving (402) test case parameters. The test case parameters may define the operation of a particular test case, such as the values typically entered by a QA engineer seeking to run a test case. For example, the parameters may include a name of the test case, various input variables for the test case, locations for code and data for the test case, and an identifier for the QA engineer. The test case administrator 302 may retrieve test case information from the test database 324, as well as associated user information from the user database 322.

The process 400 triggers the test case and notifies a mobile device client at action 404. The triggering may occur upon receipt of the test case parameters, at a preset scheduled time (such as a time selected or scheduled by a QA engineer), or at another time, such as when previous test cases in a queue have been run or when adequate bandwidth exists in the testing system. For example, the test case administrator 302 may notify a mobile device, such as the mobile device 206*a*, using the user information retrieved from the user database 322. The test case administrator 302 may trigger the test case by sending a command to a test case management system associated with the test case, such as test case management system 210*a*, using the test case management system plug-in 310*a*. Alternatively, the test case management system may trigger the test case and may report such activity to the test case administrator.

The process 400 then displays (406) the test case initiation notification. For example, the mobile device 206*a* may receive and present an SMS message from the test case administrator 302 indicating the initiation of the test case. Various forms of notifications may be assigned varying values of importance by a system or by particular users. For example, notifications of exceptions or completed test cases may be given a higher level of importance than notifications that a test case has been initiated. Particular users may then choose to be notified only about activities that exceed a certain level, so that, for example, a particular user may choose not to be notified about the initiation of a test case but may wish to hear about the completion of a test case. The user may also change their assigned alert level from time to time.

The test case management system then begins to perform the test case (408). For example, the test case management system 210*a* may receive the command from the test case administrator 302 indicating the test case to begin. Performance of the test case may occur in a conventional manner, such as by obtaining from a test case database code for running the test case and input parameters for the test case. The test case management system then performs the test case.

In the exemplary process 400, the test case management system receives an exception when performing the test case (410). The exception indicates an error or failure during the execution of the test case. For example, the test case management system 210*a* may determine that the software under test may not be in a state required by the test case before the test case may be performed, or the test case management system 210*a* may receive an unexpected output at a particular step of the test case. In addition, the code under test may "hang up" or otherwise create an error.

The process 400 then reports the received exception (412). The reporting may occur via standard messaging mechanisms that may be obtained via an application programming interface, or through interception of information that would normally be sent to a standard output device. In a like manner, the exception may be recorded in a file or in an entry in a more extensive file. For example, the test case management system 210*a* may generate a report including the exception or a list of exceptions and/or conditions that lead to the exception, such as the state of the software under test. The test case management system 210*a* then transmits the report to the test case administrator 302.

The exception report is then received by the test case administrator and reformatted to a format used by the mobile device client. Such reformatting may initially involving parsing and changing the format of data received from the test case management system to a generic format, and then changing the generically formatted data to a format for the mobile device. For example, the test case administrator 302 may receive the exception report, and the message formatter 316 may format the report or relevant portions of the report (e.g., the report name and a field identifying whether the test ran successfully or not) into an SMS message. The test case administrator then 302 transmits the report to the mobile device 206*a*.

The mobile device then displays the exception report or the portion of the report forwarded by the test case administrator (416). For example, the mobile device 206*a* may receive and present the SMS message from the test case administrator 302. The SMS message may, in addition to or instead of containing information about the test status, include data for obtaining additional test case information by other mechanisms. For example, a URL may be sent to the mobile device, and the user may then supply the URL to a web browser application, to be shown a web page containing additional detail about the test case.

After receiving the report information, the mobile device may transmit a command back to the test case administrator. For example, after reviewing the report information, a user may input a command, such as a "start" command, to the mobile device 206*a* indicating that the test should be performed again. The mobile device 206*a* may then transmit the command to the test case administrator 302.

The test case administrator then interprets/checks the command and creates an action associated with the command (420). For example, the request handler 314 of test case administrator 302 may interpret the command received from the mobile device 206*a* and check the validity of the command. The request handler 314 may determine that a parameter is missing from the command, such as the identifier for the test case to be started.

The test case administrator then sends an error message to the mobile device (422). For example, the test case administrator 302 may send an SMS message to the mobile device 206*a* indicating the syntax error in the command, or another form of error. The sent message may also contain information, such as a URL, for allowing the user to easily address the problem.

The mobile device displays (424) the error message. For example, the mobile device 206*a* receives and presents the SMS message from the test case administrator 302. Alternatively, the message may be sent as an e-mail message to an address associated with the user of the mobile device, and the e-mail may include a URL and hyperlink for selection by a user, among other information. In general, e-mail notification may carry more information than can SMS text messaging notification.

The user of the mobile device then reformulates and transmits a new command (426). The command may be similar to the user's first command, but corrected in some manner. For example, a user may input the command again using the mobile device 206*a*, or the mobile device 206*a* may correct the syntax of the command. The mobile device 206*a* sends the reformulated command to the test case administrator 302 once the new command as been received.

The test case administrator then interprets/checks the new command, and creates an action associated with the command (428). The creation of the action may involve parsing and interpreting the new command, and applying certain elements of the command to a test case management system. For example, the request handler 314 may pass the command to the communication module 312 after interpreting and checking the command. The communication module 312 passes the command to the control module 320. The control module 320 creates an action associated with the command and transmits the action request to the test case management system 210*a*.

The test case manager then begins and/or continues the test case (430). Such continued operation of a test case may then continue until, for example, the test case ends or another exception occurs. For example, the "start" command may indicate that the test case management system 210*a* is to restart the test case.

The process 400 then ends (432) the test case. For example, the test case management system 210*a* may wait a predetermined amount of time or wait for a particular output from the software under test before ending the test case.

Once the test ends, the test case management system generates a signal or stores a value representative of the completion of the test case (434). For example, the test case management system 210*a* may report the results of the test case, such as the output of the software under test and the time at which the test case completed. The test case management system 210*a* may then transmit the report or certain information from the report to the test case administrator 302.

The test case administrator receives the test case report information and reformats the test case report information to a format used by the mobile device client (436), in manners like those discussed above. For example, the test case administrator 302 may receive the test case report and the message formatter 316 may format the report (or portions of the report) into an SMS message. The test case administrator 302 transmits the report to the mobile device 206*a*.

The mobile device displays the test case report information (438) and the process 400 ends. For example, the mobile device 206*a* may receive and present to the user the SMS message from the test case administrator 302.

Referring to FIG. 4B, the process 450 may be performed by a mobile device, a test case administrator, and a test case management system when performing a test case initiated by a user of the mobile device. In general, process 450 shows the initiation of a test from a remote mobile device, followed by a request from for the remote mobile device for report information relating to the test case.

The process 450 begins with when a user of the mobile device sends a start message to the test case administrator (452). The command may be entered, for example, by the user selecting a control on an xHTML web page labeled "start," and linked to a test case management system. For example, the mobile device 206*a* may receive an input from a user indicting that a particular test case is to be started. The mobile device 206*a* then transmits a start command to the test case administrator 302.

The test case administrator then checks credentials associated with the message (454). The credentials may include various mechanisms for ensuring that only authorized users may interact with the system, such as user name and password pairs. For example, the request handler 314 may verify that the command was received from an SMS address associated with the test case. In addition, the command may include a user name and/or password that the request handler 314 may compare to a stored user name and/or password in the user database 322.

The test case administrator them identifies a test case associated with the message (456). For example, the message syntax may include a test case identifier after the command name. The request hander 314 may interpret the test case identifier included in the message from the mobile device 206*a*, and may check a database for a more complete identifier for the test case (e.g., the user can entered a shortened proxy for the full test case name).

The test case administrator then triggers the test case and notifies the mobile device client (458). Such action may involve the sending of simultaneous or near simultaneous messages from the test case administrator to the mobile device and to the appropriate test case management system. The test case administrator may initially perform look-ups for addressing information, i.e., to determine which test case management system to trigger when there are multiple systems. For example, the test case administrator 302 may notify a mobile device, such as the mobile device 206*a*, using the user information retrieved from the user database 322. The test case administrator 302 may trigger the test case by sending a command to a test case management system associated with the test case, such as test case management system 210*a*, using the test case management system plug-in 310*a*.

The test case management system then begins to perform the test case (460). The performance of the test case may proceed in a conventional manner until further communications with the mobile device are required. For example, the test case management system 210*a* may receive the command from the test case administrator 302 indicating the test case to begin. The test case management system 210*a* gathers the appropriate data (e.g., code) and other parameters and performs the test case. Upon receiving a message from the test case administrator, the mobile device will also display a test case initiation notification (462). For example, the mobile device 206*a* may receive and present an SMS message from the test case administrator 302 indicating the initiation of the test case.

The user of the mobile device then sends a report query (464). For example, the mobile device 206*a* may send a request to the test case administrator 302 for a report indicating the status of the test case. Such a request may occur after the user has received an indication that a test case has completed, or may occur when a user has not received an expected notification and wants to know what is happening with the test case.

The test case administrator again checks credentials associated with the report query (466), in a manner similar to that discussed above. For example, the request handler 314 may verify that the report request was received from an SMS address associated with the test case. In addition, the report request may include a user name and/or password that the request handler 314 may compare to a stored user name and/or password in the user database 322.

The test case administrator then converts the query to a reporting command (468). The conversion may include an initial conversion to a generic format, followed by a conversion to a format consistent with the particular test case management system on which the test case has run or is running. For example, the control module 320 may convert the report request to a command, such as an API call, to a plug-in that communicates with the test case management system 210*a*.

The test case administrator then submits the reporting command (470). For example, the control module 320 transmits the reporting command to the test case management system 210*a* through interface 306. The test case management system then runs the report (472), and transmits data relating to the report back to the test case administrator (474). Such transmission may also occur by the test case management system saving the report to a predetermined location, followed by the test case administrator accessing the report.

The test case administrator receives the test case report and reformats the test case report to a format used by the mobile device client (476). The reformatting may include rearranging the data, removing certain data, or combining date so as to match the particular communication abilities of the mobile device. For example, the test case administrator 302 may receive the test case report and the message formatter 316 may format the report in an SMS message. Where the reporting is via SMS, for example, much of the information from a full report may be removed, and a relatively short summary of the test case status may be provided.

The test case administrator then transmits the report data to the mobile device (478), which then displays the report data (which may include a full report or a subset of data from a full report).

Figure 5:
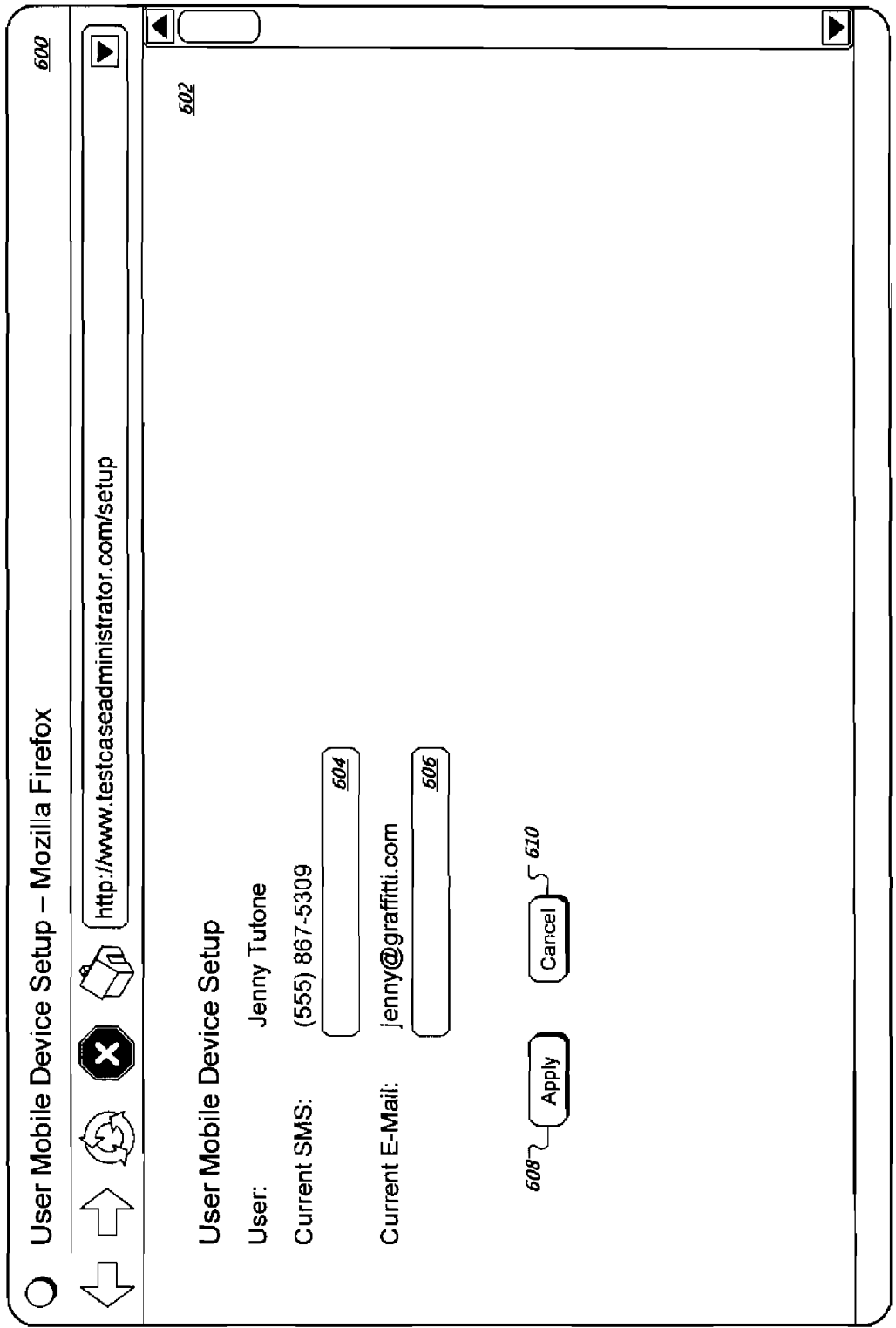
FIG. 5 is an example of a graphical user interface showing mobile registration information for a test case management system.

FIG. 5 is an example of a graphical user interface (GUI) 600 showing mobile registration information for a test case management system. In general, the GUI 600 shows information that a user such as a QA engineer may enter in setting up an account with a test case administrator so that the test case administrator knows how to address the user when the user is at a mobile device. For example, a user at the control terminal 328 may input one or more mobile device addresses associated with a particular user using the GUI 600. The GUI 600 is displayed in a web browser application. The GUI 600 shows a web page 602 provided by a test case administrator, such as the test case administrator 302.

The web page 602 includes input controls 604 and 606 that allow a user to input an SMS address and an e-mail address, respectively, of mobile devices associated with a particular user. The web page 602 also includes selection controls 608 and 610 that allow a user to apply or cancel, respectively, inputs made in the input controls 604 and 606. The SMS address and the e-mail address may be used, for example, by the test case administrator 302 to send notifications to the user regarding test cases associated with the user. Though not shown, the user may also enter scheduling information to control when mobile notification is enabled. For example, the user may enter a work schedule (e.g., 7 a.m. to noon, and 1 p.m. to 6 p.m.) during which communications are not sent to their mobile device, and for which communications are sent to the mobile device during other hours.

Figure 6A:
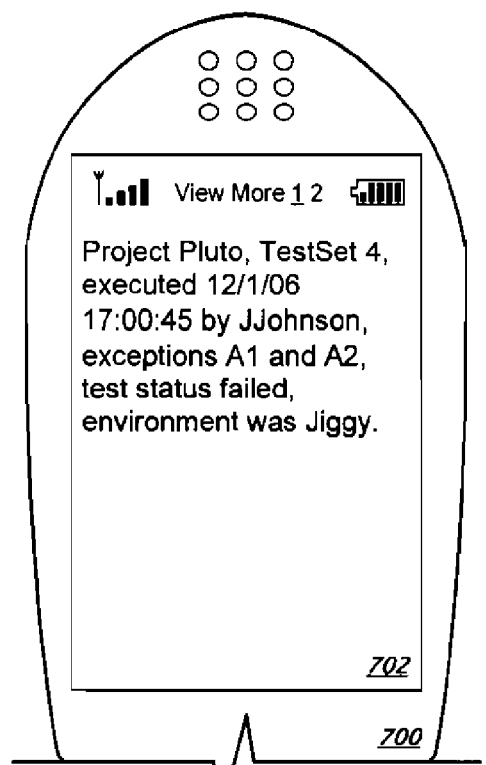
FIG. 6A is an example of a mobile device showing test case information from text messaging.

FIG. 6A is an example of a mobile device 700 showing test case information from text messaging. The mobile device 700 includes a display 702 capable of presenting SMS text messages, such as a message indicating the status of a test case. The basic message here shows that a test case named Pluto, having a test set number 4, was executed on Dec. 1, 2006 at 45 seconds after 5 p.m. by a technician named Johnny Johnson. The test threw exceptions relating to the test set that was executed, and was determined to have failed. This may indicate that there was a problem with the test case code or the test environment in which the code was run, or may indicate that there is a potential bug in the system. The exceptions may be indicated by a description, a name, or a code—here, A1 and A2 (which the QA engineer may have memorized or may have access to in an exceptions index).

The test environment may include the details of the machines on which the test was run (e.g., Windows vs. Mac, Intel vs. G4, RAM, etc.), and each configuration may be given a name—here, Jiggy. One or more links may be provided to each piece of information in the report. For example, a click-to-call link may be provided to Johnny Johnson's desk telephone so that the recipient of the message may easily call him to discuss the test. Likewise, links (e.g., hyperlinks) may be provided to each of the exceptions, so that the recipient may easily download more information about the particular exception, so as to make decisions about follow up testing.

Figure 6B:
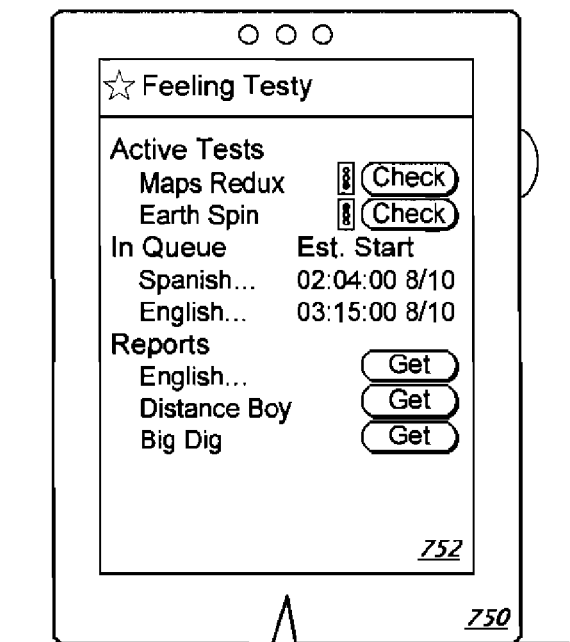
FIG. 6B is an example of a mobile device showing test case information using a markup language.

FIG. 6B is an example of a mobile device 750 showing test case information. The exemplary display shows a summary view for a particular user, showing controls for obtaining additional information about a number of test reports that the user is about to run, is running, or has recently run.

The mobile device 750 includes a display 752 capable of displaying markup language, such as HTML, xHTML, c-HTML, or WML. In certain implementations, the display 752 may present graphical elements or images. Here, the display 752 presents a report of the status of a list of test cases.

In general, the display provides an example of an overview screen for a particular QA engineer, with information about all or most of the engineer's outstanding testing program being shown. Selection of one of the test cases may produce an output like that shown in FIG. 6A. Stop light symbols indicate whether active test cases are in progress, paused, or stopped due to an exception. The status of test cases in progress may be retrieved. The display 752 also includes a list of queued test cases and their estimated start times. In addition, reports may be retrieved for completed test cases. A user may make inputs to select report and/or status retrieval controls using input devices, such as a scroll wheel, voice recognition, a stylus and touch screen, or a keypad.

Figure 7:
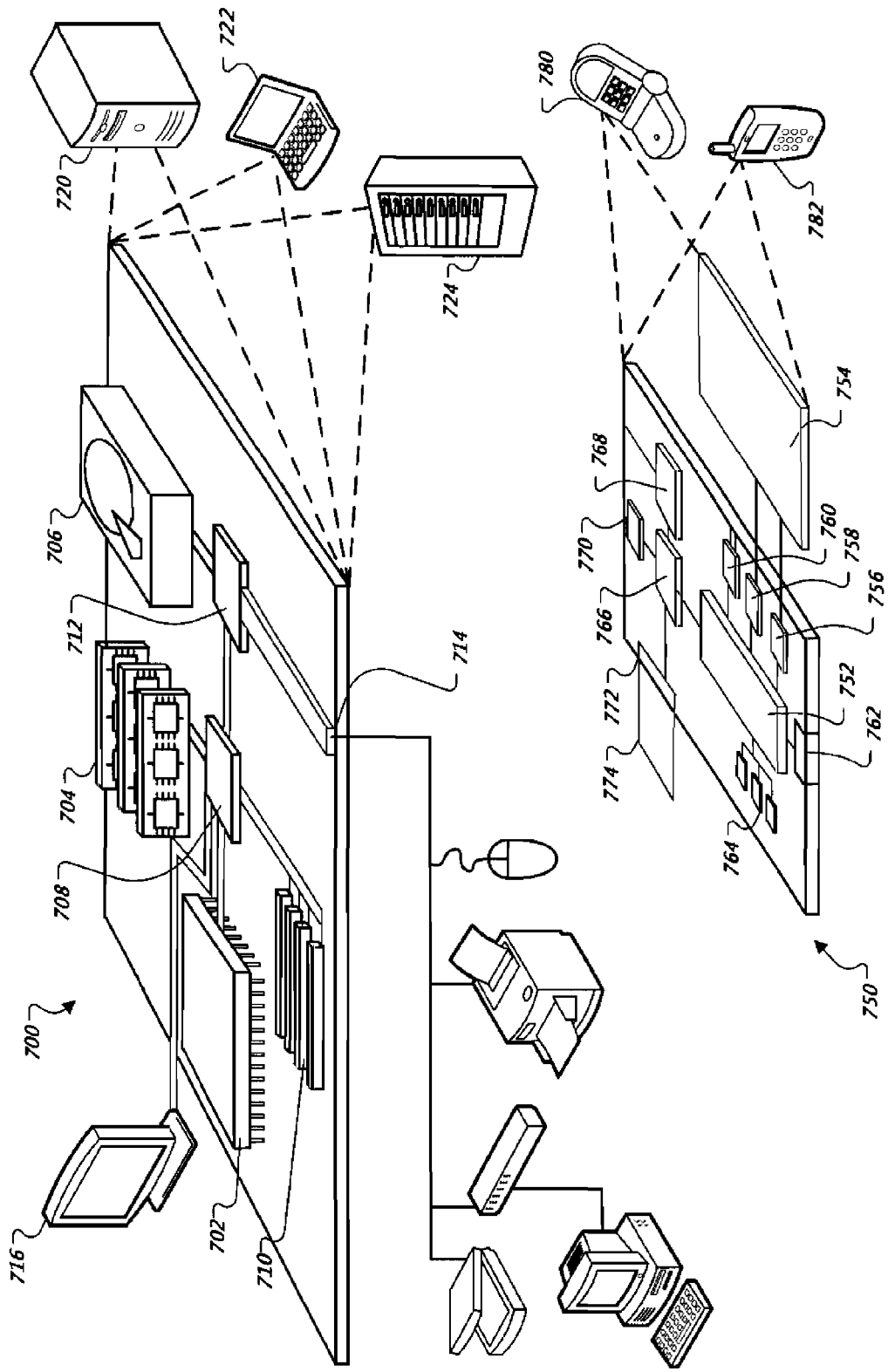
FIG. 7 shows an example of a generic computer device and a generic mobile computer device.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method of remotely managing a software test case using a mobile device, comprising:
    receiving, at a test case administrator system, a request from a mobile device for a report on a test case performed by a test case management system;
    checking credentials of the mobile device to determine that the mobile device is authorized to access the report on the test case;
    identifying a device type for the mobile device;
    based on the identified device type, determining a format according to which the report on the test case is to be arranged such that the report on the test case is displayable on the mobile device;
    converting the report on the test case in accordance with the format to obtain a converted report on the test case;
    transmitting the converted report on the test case from the test case administrator system to the mobile device;
    receiving, from the mobile device after the test case has been performed, a command to start a subsequent test case; and
    issuing an instruction to the test case management system to start the subsequent test case in response to the command.

2. The method of claim 1, wherein the request is received through an application programming interface (API).

3. The method of claim 1, further comprising associating the request with the mobile device by applying a user associated with the test case in the test case management system to a database that correlates users to mobile device identifiers.

4. The method of claim 1, wherein the request comprises a Short Message Service (SMS) text message, and wherein converting the report on the test case comprises converting the report on the test case into an SMS format, and wherein transmitting the converted report on the test case comprises transmitting the converted report on the test case as an SMS text message.

5. The method of claim 1, wherein converting the report on the test case comprises converting the report on the test case into an e-mail format, and wherein transmitting the converted report on the test case comprises transmitting the converted report on the test case as an e-mail message containing a hyperlink associated with the test case.

6. The method of claim 5, further comprising receiving from the mobile device a request from the hyperlink and transmitting mobile web-based data in response.

7. The method of claim 6, wherein the web-based data comprises data in a format selected from the group consisting of WML, xHTML, iMode, and XML.

8. The method of claim 4, wherein checking the credentials of the mobile device comprises verifying that an SMS address of the mobile device is authorized to access the report on the test case.

9. The method of claim 1, further comprising generating code for execution on the mobile device displaying graphical status indicators associated with the converted report on the test case for indicating a status of the test case.

10. A computer-implemented system, comprising:
    a first interface at a test case administrator system configured to receive testing information from one or more test case managers, wherein the received testing information includes results of one or more test cases performed by the one or more test case managers;
    a message converter that converts the received testing information into converted testing information structured according to one or more mobile messaging formats that are supported by one or more types of mobile devices; and
    a second interface configured to transmit the converted testing information from the test case administrator system to the one or more types of mobile devices,
    wherein the second interface is configured to receive control information from the one or more types of mobile devices, the control information being used to control the one or more test case managers to affect performance of the one or more test cases,
    wherein the message converter converts the received control information into converted control information structured according to one or more control formats that are supported by the one or more test case managers.

11. The system of claim 10, further comprising a user database that correlates test case user identifiers with mobile device identifiers.

12. The system of claim 11, wherein the first interface comprises a first application programming interface (API).

13. The system of claim 12, wherein the first interface comprises a plug-in module for the first application programming interface.

14. The system of claim 13, wherein the second interface comprises a second application programming interface (API).

15. The system of claim 10, wherein the second interface comprises an application programming interface (API).

16. The system of claim 10, wherein the second interface comprises a text messaging module.

17. The system of claim 10, wherein the second interface comprises an e-mail module.

18. The system of claim 10, wherein the message converter is further adapted to convert queries from the one or more types of mobile devices to commands for the one or more test case managers.

19. A computer-implemented system, comprising:
a first interface configured to receive testing information from a test case manager, wherein the received testing information includes results of one or more test cases performed by the test case manager;
a first module associated with the test case manager to generate translated testing information from the testing information, the translated testing information being in a format supported by a mobile device to which the translated testing information is to be transmitted;
a second interface configured to transmit the translated testing information to the mobile device and to receive control information from the mobile device; and
a second module associated with the mobile device to generate translated control information from the control information, the translated control information being in a format supported by the test case manager and being used to control the test case manager to affect performance of the one or more test cases.

20. The system of claim 19, wherein the control information received from the mobile device comprises a command to restart a particular one of the test cases in response to an exception indicator included in the testing information that is associated with the particular one of the test cases.

21. The method of claim 1, further comprising transmitting to the mobile device, with the converted report, data for generating a user-selectable control that, when selected by the user, causes the mobile device to generate the command to start the subsequent test case.

* * * * *

UNITED STATES PATENT AND TRADEMARK OFFICE
CERTIFICATE OF CORRECTION

| | | |
|---|---|---|
| PATENT NO. | : 8,538,414 B1 | Page 1 of 1 |
| APPLICATION NO. | : 11/779031 | |
| DATED | : September 17, 2013 | |
| INVENTOR(S) | : Beans et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1087 days.

Signed and Sealed this
Twenty-fourth Day of February, 2015

Michelle K. Lee
*Deputy Director of the United States Patent and Trademark Office*